(12) United States Patent
Hayasaki

(10) Patent No.: US 7,296,864 B2
(45) Date of Patent: Nov. 20, 2007

(54) CONTROL METHOD FOR PRINTING APPARATUS

(75) Inventor: Kimiyuki Hayasaki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 10/629,919

(22) Filed: Jul. 30, 2003

(65) Prior Publication Data

US 2004/0021710 A1 Feb. 5, 2004

(30) Foreign Application Priority Data

Aug. 1, 2002 (JP) ............................. 2002-224878
Jan. 22, 2003 (JP) ............................. 2003-013733

(51) Int. Cl.
*B41J 29/38* (2006.01)
*B41J 29/393* (2006.01)

(52) U.S. Cl. ............................... 347/5; 347/9; 347/19

(58) Field of Classification Search .................... 347/5, 347/20, 9, 37, 19, 86
See application file for complete search history.

(56) References Cited

U.S. PATENT DOCUMENTS

| | | | |
|---|---|---|---|
| 4,313,124 A | | 1/1982 | Hara |
| 4,345,262 A | | 8/1982 | Shirato et al. |
| 4,463,359 A | | 7/1984 | Ayata et al. |
| 4,723,129 A | | 2/1988 | Endo et al. |
| 4,740,796 A | | 4/1988 | Endo et al. |
| 5,138,344 A | * | 8/1992 | Ujita ........................... 347/86 |
| 5,353,051 A | | 10/1994 | Katayama et al. |
| 5,431,502 A | * | 7/1995 | Orii et al. .................... 400/279 |
| 5,485,178 A | * | 1/1996 | Tateyama et al. ............... 347/5 |
| 5,610,635 A | * | 3/1997 | Murray et al. .................. 347/7 |
| 5,788,388 A | * | 8/1998 | Cowger et al. ............. 400/703 |
| 5,812,156 A | * | 9/1998 | Bullock et al. ............... 347/19 |
| 5,894,315 A | * | 4/1999 | Yamane ........................ 347/37 |
| 6,116,711 A | * | 9/2000 | Umezawa et al. ............ 347/14 |
| 6,116,714 A | | 9/2000 | Imanaka et al. |
| 6,116,717 A | * | 9/2000 | Anderson et al. ............. 347/19 |
| 6,196,670 B1 | | 3/2001 | Saruta |
| 6,318,828 B1 | | 11/2001 | Barbour et al. |
| 6,476,928 B1 | * | 11/2002 | Barbour et al. ............ 358/1.15 |
| 6,494,559 B1 | | 12/2002 | Tsuji |
| 6,522,416 B1 | * | 2/2003 | Matsumoto et al. ....... 358/1.14 |
| 6,533,383 B1 | * | 3/2003 | Saruta et al. ................. 347/19 |
| 6,631,967 B1 | * | 10/2003 | Saruta ......................... 347/19 |
| 6,862,652 B1 | * | 3/2005 | Tsuji .......................... 711/103 |

(Continued)

FOREIGN PATENT DOCUMENTS

EP 0 710 562 A1 5/1996

(Continued)

*Primary Examiner*—Stephen Meier
*Assistant Examiner*—Leonard Liang
(74) *Attorney, Agent, or Firm*—Fitzpatrick, Cella, Harper & Scinto

(57) ABSTRACT

In a printing apparatus which performs printing by using a printhead having a printing element unit for performing printing and a memory block, the control circuit of the printing apparatus main body outputs a command for acquiring specific information from information held by the memory block. Upon reception of this command, the command control unit of a carriage control unit generates an access signal containing an address for reading out information designated by the command from the memory block. The command control unit accesses the memory block by the access signal, and acquires specific information corresponding to the command from the memory block.

5 Claims, 17 Drawing Sheets

U.S. PATENT DOCUMENTS

| | | | |
|---|---|---|---|
| 6,863,377 B2 * | 3/2005 | Walker et al. | 347/50 |
| 7,226,143 B2 * | 6/2007 | Mitsuzawa | 347/15 |
| 7,239,413 B2 * | 7/2007 | Owen et al. | 358/1.15 |
| 2002/0196302 A1 | 12/2002 | Saruta | |

FOREIGN PATENT DOCUMENTS

| | | |
|---|---|---|
| EP | 1 070 598 A1 | 1/2001 |
| EP | 1 079 326 A2 | 2/2001 |
| JP | 05193127 A * | 8/1993 |
| JP | 7-241992 | 9/1995 |
| JP | 8-132645 | 5/1996 |
| KR | 2000-35729 | 6/2000 |

* cited by examiner

FIG. 6

| INFORMATION IDENTIFICATION NAME | STORAGE ADDRESS |
|---|---|
| HEAD TYPE INFORMATION | 0xXXXX ~ 0xYYYY |
| RANK INFORMATION | 0xPPPPP ~ 0xQQQQ |
| DRIVING CONTROL INFORMATION | 0xSSSS ~ 0xTTTT |
| HEAD CORRECTION INFORMATION | 0xUUUU ~ 0xVVVV |
| INK TYPE INFORMATION | 0xRRRR ~ 0xMMMM |
| MANUFACTURING TIME INFORMATION | 0xNNNN ~ 0xLLLL |
| USE STATUS INFORMATION | 0xJJJJ ~ 0xKKKK |
| ⋮ | ⋮ |

CONTROL METHOD FOR PRINTING APPARATUS

FIELD OF THE INVENTION

The present invention relates to a printing apparatus control method and, more particularly, to a method of controlling a printing apparatus which can read out printhead feature information held by, e.g., an ink-jet printhead.

BACKGROUND OF THE INVENTION

Printing apparatuses which print information such as a desired character or image on a sheet-like printing medium such as a paper sheet or film are widely used as an information output apparatus in a word processor, personal computer, facsimile apparatus, and the like. These printing apparatuses are used as printers in current business offices, in other business affairs departments, and for personal use. On the other hand, the printing apparatuses have been developed and improved for achieving further cost reduction, higher resolution, and the like while strongly requiring high density and high-speed printing.

Of these printing apparatuses, an ink-jet printing apparatus which discharges ink from the orifices of printing elements to perform printing as quiet nonimpact printing can realize high density and high-speed printing because of its structural feature, and is widely spread as a low-cost color printer or the like. The ink-jet printing apparatus performs printing by discharging ink in accordance with desired printing information by using a printhead having a printing element (nozzle) with an orifice and an electrothermal transducer which generates discharge energy for discharging ink from the orifice.

As the printhead structure, various printheads in which a plurality of printing elements are aligned in one or a plurality of lines have conventionally been known. In a printhead of this type, N printing elements are designed as one block, and several or several tens of driving integrated circuits which can be simultaneously driven are mounted on a single board. Image data are aligned in correspondence with printing elements, and arbitrary printing is done on a printing medium such as a paper sheet by driving the recording elements.

With recent increases in resolution and image quality, the printhead performance has greatly been improved. The number of printing elements to be simultaneously driven increases because the number of printing elements has been increased for higher resolution and higher image quality or in order to increase the printing speed. Various types of printheads are proposed in accordance with the performance of the printer main body, and a printhead having, information for identifying the type of printhead is also available. An ink-jet printhead has various pieces of printhead information necessary for the printer main body, such as the ink use amount of an expendable ink cartridge.

In the printhead, as the number of printing elements to be simultaneously driven becomes larger, energy necessary for driving also becomes larger. A printing element driving method corresponding to the capacitance of a power supply circuit is required. For a printing element which performs printing by using heat, continuous driving of one printing element accumulates heat, changing the printing concentration or destructing the printing element itself. In the presence of a factor such as manufacturing variations, proper printing element energy cannot be obtained for application energy, which degrades the printhead durability or the like.

A printing element is also influenced by an adjacent printing element. For example, in an ink-jet printing apparatus, when adjacent printing elements are simultaneously driven, nozzles receive pressure interference owing to a pressure generated in ink discharge. The pressure interference (crosstalk) may change the printing concentration. It is, therefore, desirable to set an idle time for dissipating heat or avoiding crosstalk.

In addition, many demands have arisen for driving control corresponding to the printing agent use amount of a cartridge which stores a printing agent, particularly, the ink cartridge use amount of an ink-jet printhead. These demands vary for the difference in ink color information or manufacturing date, the difference in ink viscosity, the difference in use purpose, or the like.

To cope with these problems and demands, there is proposed an arrangement in which the printhead incorporates a means for detecting a printhead temperature, a means capable of arbitrarily changing a driving method by an external input signal, and a means for detecting the difference between printheads due to manufacturing variations, and if necessary, pieces of information are extracted and controlled (see, e.g., Japanese Patent Laid-Open No. 7-241992). A circuit arrangement in which printing elements are grouped into a plurality of blocks every predetermined number of printing elements and the blocks are driven in time division is put into practical use.

In a printing apparatus using such printhead, the number of printing elements in the printhead tends to increase for the purpose of high printing speed and high printing density. Accordingly, the number of blocks in the above-mentioned time division driving increases, and the number of control signal lines also increases even in the use of a decoder circuit or the like. As the image quality and function are improved, the printhead structure becomes complicated, and its control becomes cumbersome, overloading the control unit of the main body apparatus on which the printhead is mounted.

For example, the control unit must manage/execute a control sequence of, e.g., changing a driving pattern in accordance with the operation mode of the printhead, manage and calibrate the influence of the difference in printing state on an image owing to printhead manufacturing variations or the difference between lots, determine the type of head, or sequentially monitor the driving status.

To cope with the above problems, a recent printhead has a data holding function such as a nonvolatile memory (to be simply referred to as a memory hereinafter). The memory stores, as printhead feature information, data such as manufacturing variation information of a printing element or temperature sensor, manufacturing time information containing a printhead manufacturing date, printhead structure information, and a printhead printing dot count value. The printhead memory holds data such as the feature information in a non-rewritable or rewritable state. When, for example, the printhead is mounted on the main body apparatus, all data stored in the memory are read out. Necessary information is reflected in the internal register of the main body apparatus or the like, realizing control corresponding to each printhead. The recording apparatus refers to mapping information which makes the type of information and a storage position correspond to each other, extracts information necessary for control from all data read out from the printhead memory, and utilizes the information for various control operations.

In real-time driving control of performing driving coping with, e.g., temperature detection during printing, processing in correspondence with mapping during read of all data (feature information or the like) from the memory decreases the throughput, failing to achieve high-speed, high-image-quality printing. Especially for a thermal head and ink-jet printhead that ejects ink by utilizing heat, the printing temperature greatly influences a printed image. Hence, driving energy control corresponding to the printhead temperature is important, and is an indispensable function for a printing apparatus requiring high-image-quality. The printing apparatus must send a large amount of printing data to the printhead at a high speed, and it is difficult to execute control during detection of printhead information in terms of the processing time.

More specifically, the printing apparatus is used in various ways with different ink colors at different viscosities. In real-time driving control of performing driving coping with the difference in the ink storage amount of the ink tank (change in negative pressure in the ink tank or the like), processing in correspondence with mapping during read of all data (feature information or the like) from the memory decreases the throughput, failing to achieve high-speed, high-image-quality printing. In a general low-cost nonvolatile memory, the access time to the memory is several 150 μs to 10 ms (write) even for one address. It becomes difficult to leave and refer to the log by frequent accesses.

One problem of the prior art is that read of data from the printhead takes a long time because all data in the printhead are read out to the printing apparatus and necessary data are selected and used in the printing apparatus. This can be ignored when data is read out from the printhead at a timing when a sufficient time can be used for read (e.g., a timing when the printing apparatus is powered on). However, when data must be extracted from the printhead within a short time for the above-mentioned real-time driving control or the like, no long time can be ensured, and many pieces of information cannot be processed.

Every time the number of types of printheads increases, mapping information of the memory for each printhead must also be set, and read processing in the printing apparatus must be changed for each type of printhead. To allow the printing apparatus to extract common specific information from various types of printheads by the same read processing, the memory storage method and storage address must be common between different types of printheads. In this case, the degree of freedom of using a memory for each printhead is greatly limited.

Considering the above conventional drawbacks, it is desired to provide a printing apparatus control method which can efficiently extract information held by a printhead at a high speed, and does not limit the degree of freedom of using a memory regardless of the type of memory and the access method in the printhead.

SUMMARY OF THE INVENTION

According to one aspect of the present invention, there is provided a method of controlling a printing apparatus which performs printing by using a printhead having a printing element and a storage unit, the printing apparatus including a first control unit which controls overall operation of the printing apparatus, and a second control unit which can operate independently of the first control unit. The method comprises: an instruction generation step of causing the first control unit to generate an instruction for acquiring specific information from information held by the storage unit of the printhead; an acquisition step of causing the second control unit to receive the control instruction generated by the first control unit in the instruction generation step, generate an address for accessing the storage unit of the printhead, access the storage unit at the address, and acquire the specific information corresponding to the instruction; and a control step of causing the second control unit to drive and control the printhead on the basis of information which is generated on the basis of the information acquired in the acquisition step in order to drive the printhead.

According to another aspect of the present invention, there is provided a printing apparatus which performs printing by using a printhead having a printing element and a storage unit. The printing apparatus comprises: instruction generation means for generating an instruction for acquiring specific information from information held by the printhead; acquisition means for receiving the control instruction generated by said instruction generation means, accessing the storage unit of the printhead, and acquiring the specific information corresponding to the instruction from the storage unit; and control means for driving and controlling the printhead on the basis of information which is generated on the basis of the information acquired by said acquisition means in order to drive the printhead.

Furthermore, according to another aspect of the present invention, there is provided a printhead having a printing element and a storage unit. The printhead comprises: a reception unit which receives an instruction output from a printing apparatus supporting the printhead; and a control unit which reads out specific information corresponding to the instruction received by said reception unit from the storage unit, and outputs the specific information to the printing apparatus.

Furthermore, according to another aspect of the present invention, there is provided an element base for a printhead having a printing element and a memory. The element base comprises: a reception circuit which receives an instruction output from a printing apparatus supporting the printhead; and an output circuit which acquires specific information corresponding to the instruction received by said reception circuit from the memory, and outputs the specific information to the printing apparatus.

Furthermore, according to another aspect of the present invention, there is provided a method of controlling a printing apparatus including a printhead which has a printing element and supports an ink tank with a storage unit, a first control unit which controls overall operation of the printing apparatus, and a second control unit which can operate independently of the first control unit. The method comprises: an instruction generation step of causing the first control unit to generate an instruction for accessing the storage unit of the ink tank; and an access step of causing the second control unit to receive the instruction generated by the first control unit in the instruction generation step, generate an address for accessing the storage unit of the ink tank, and access the storage unit at the address.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table showing a data structure example of a table which makes the address and information identification name of information stored in a memory block correspond to each other;

DETAILED DESCRIPTION OF THE PREFERRED EMBODIMENTS

Preferred embodiments of the present invention will now be described in detail in accordance with the accompanying drawings.

The following embodiments will exemplify a printing apparatus using an ink-jet printhead.

In this specification, "printing" (to be also referred to as "print") is to form an image, design, pattern, or the like on a printing medium or process a medium regardless of whether to form significant information such as a character or figure, whether information is significant or insignificant, or whether information is so visualized as to allow a user to visually perceive it.

"Printing media" are not only paper used in a general printing apparatus, but also ink-receivable materials such as cloth, plastic film, metal plate, glass, ceramics, wood, and leather.

"Ink" (to be also referred to as "liquid") should be interpreted as broadly as the definition of "printing (print)". "Ink" represents a liquid which is applied to a printing medium to form an image, design, pattern, or the like, process the printing medium, or contribute to ink processing (e.g., solidification or insolubilization of a coloring material in ink applied to a printing medium).

"Nozzles" include orifices, liquid channels communicating with the orifices, and elements which generate energy used to discharge ink, unless otherwise specified.

First Embodiment

Figure 1:
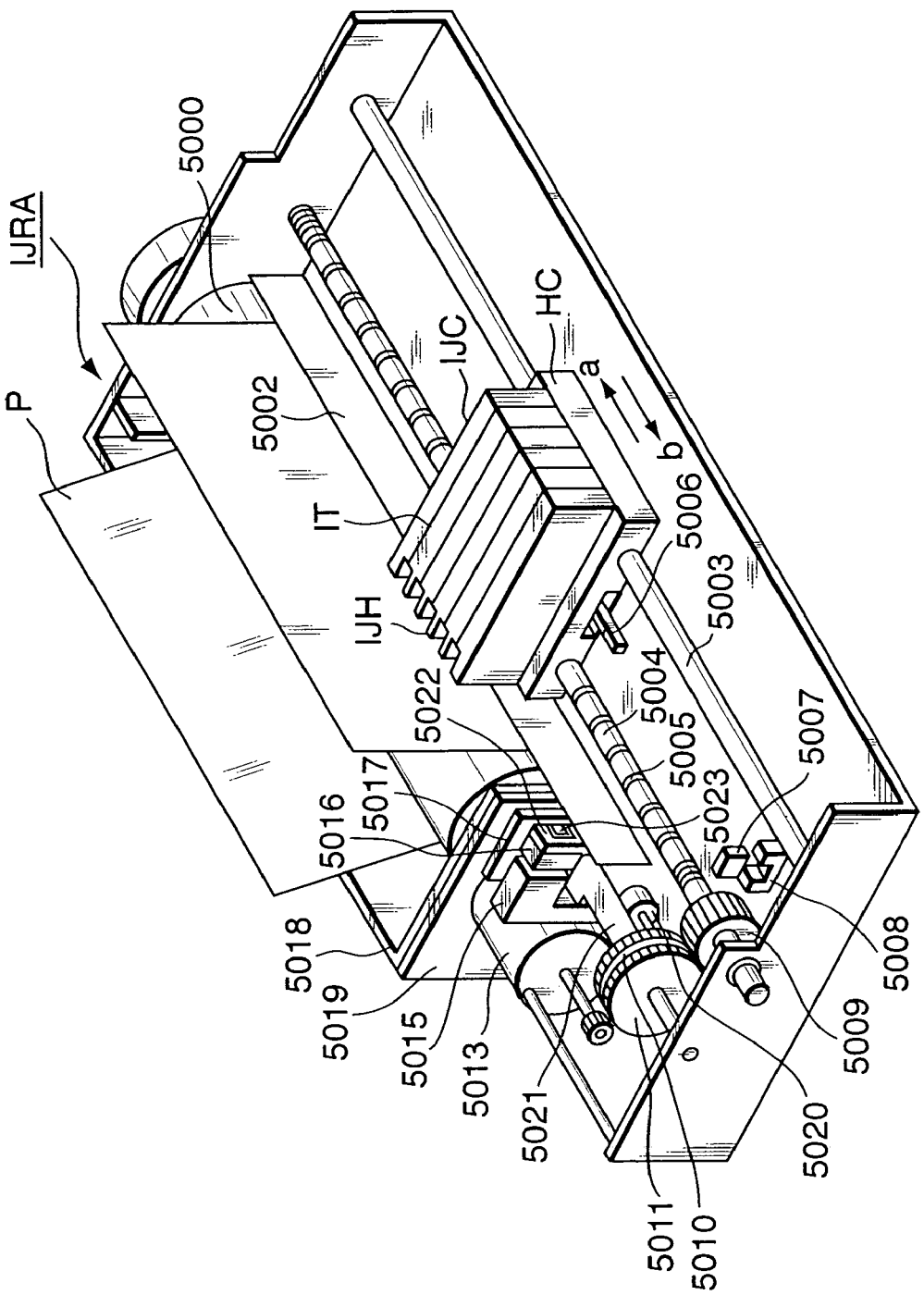
FIG. 1 is a schematic view showing an ink-jet printing apparatus as a typical embodiment of the present invention.

FIG. 1 is a schematic view showing an ink-jet printing apparatus as a typical embodiment of the present invention. In FIG. 1, a lead screw 5004 rotates via driving force transfer gears 5011 and 5009 while interlocking with forward/reverse rotation of a carriage motor 5013. A carriage HC has a pin (not shown) which engages with a helical groove 5005 of the lead screw 5004, and reciprocates in directions indicated by arrows a and b along with rotation of the lead screw 5004. The carriage HC supports an ink-jet cartridge IJC. The ink-jet cartridge IJC comprises a printhead IJH and an ink tank IT which stores printing ink.

The printhead IJH includes printheads for monochrome printing and color printing, and either printhead can be properly selected and mounted on the carriage HC by the user in accordance with the purpose. In the use of the printhead for monochrome printing, an ink tank IT which stores monochrome ink (black ink) is mounted. In the use of the printhead for color printing, four ink tanks IT which respectively store four inks, namely, yellow, magenta, cyan, and black inks, as shown in FIG. 1, are mounted.

The ink-jet cartridge IJC is constituted by an ink tank and printhead which may be integrated or separable.

Reference numeral 5002 denotes a sheet press plate which presses a paper sheet against a platen 5000 in the carriage moving direction. The platen 5000 is rotated by a convey motor (not shown), and conveys a printing sheet P. Reference numerals 5007 and 5008 denote photosensors serving as home position detection means for detecting the presence of a carriage lever 5006 in a corresponding region and switching the rotational direction of the motor 5013; 5016, a member which supports a cap member 5022 that caps the front surface of the printhead; 5015, a suction means which sucks the interior of the cap and performs suction recovery of the printhead via an intra-cap opening 5023; 5017, a cleaning blade; and 5019, a member capable of moving the blade back and forth. These members are supported by a main body support plate 5018. The blade is not limited to this form, and this embodiment can employ a known cleaning blade. Reference numeral 5021 denotes a lever which starts suction for suction recovery, and moves along with movement of a cam 5020 engaged with the carriage. A driving force from the driving motor is controlled by a known transfer mechanism such as a clutch switch.

Capping, cleaning, and suction recovery are executed by desired processes at corresponding positions by the operation of the lead screw 5004 when the carriage comes to the home-position region. This embodiment can adopt any arrangement as long as desired operations are done at known timings.

A control arrangement for executing printing control of the above-described apparatus will be described.

Figure 2:
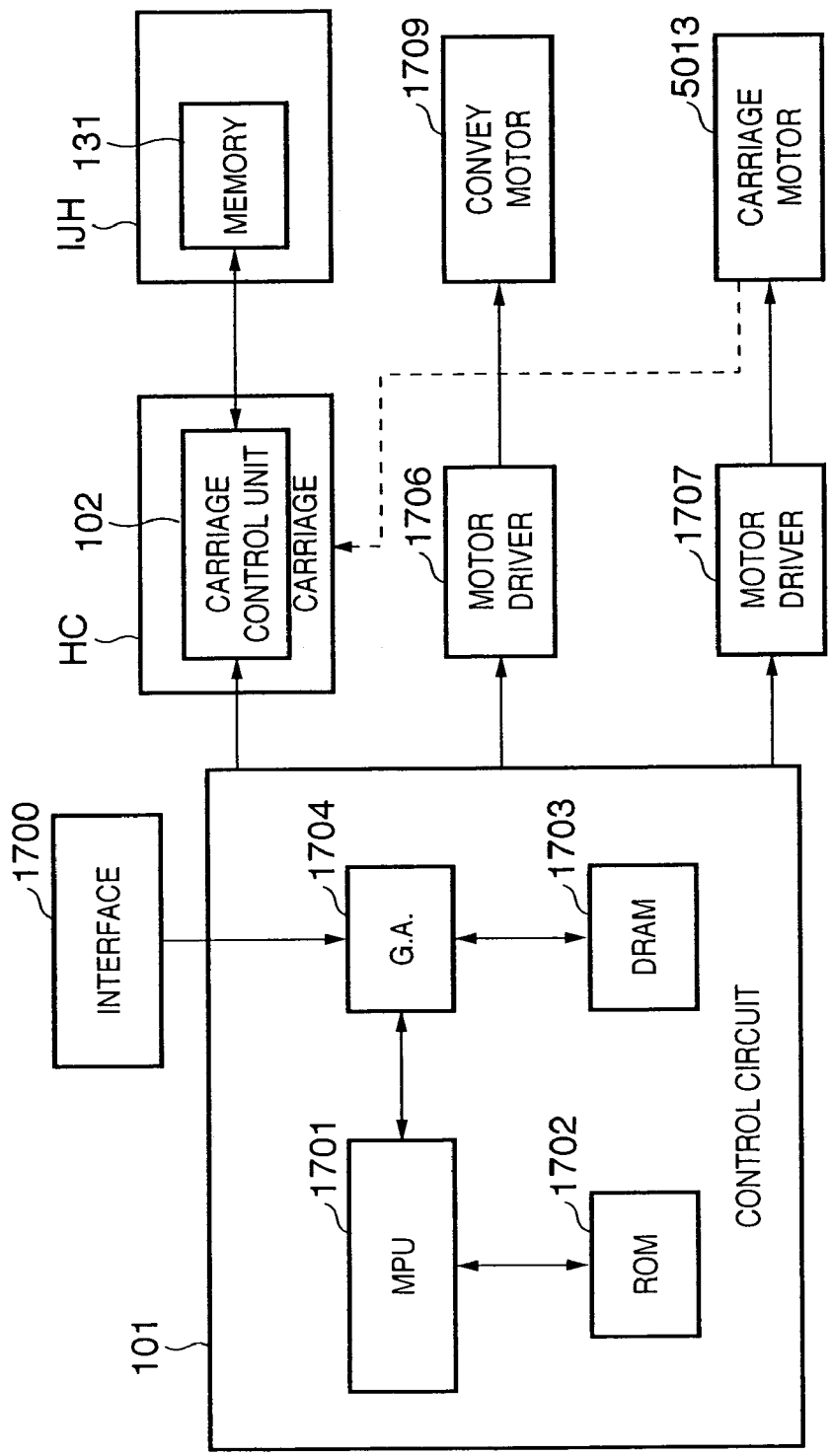
FIG. 2 is a block diagram showing the arrangement of the control circuit of the printing apparatus shown in FIG. 1.

FIG. 2 is a block diagram showing the arrangement of the control circuit of the printing apparatus shown in FIG. 1.

In FIG. 2, reference numeral 1700 denotes an interface which inputs a printing signal; 1701, an MPU; 1702, a ROM which stores a control program executed by the MPU 1701; 1703, a DRAM (to be referred to as a RAM hereinafter) which stores various data (printing signal, printing data supplied to the head, and the like); and 1704, a gate array (G.A.) which controls supply of printing data to a printhead IJH, and also controls data transfer between the interface 1700, the MPU 1701, and the RAM 1703. A control circuit 101 has this arrangement.

Reference numeral 1709 denotes a convey motor (not shown in FIG. 1) for conveying a printing sheet P; 1706, a motor driver for driving the convey motor 1709; and 1707, a motor driver for driving the carrier motor 5013.

The operation of the control arrangement will be explained. When a printing signal is input to the interface 1700, the printing signal is converted into printing data between the gate array 1704 and the MPU 1701. The motor drivers 1706 and 1707 are driven, and the printhead IJH is driven through a carriage control unit 102 in accordance with the printing data sent to the carriage HC to print an image on the printing sheet P.

For optimal driving in driving the printing element unit of the printhead IJH, the driving condition of each printing element is determined by referring to feature information held in the memory 131 of the printhead IJH.

Figure 3:
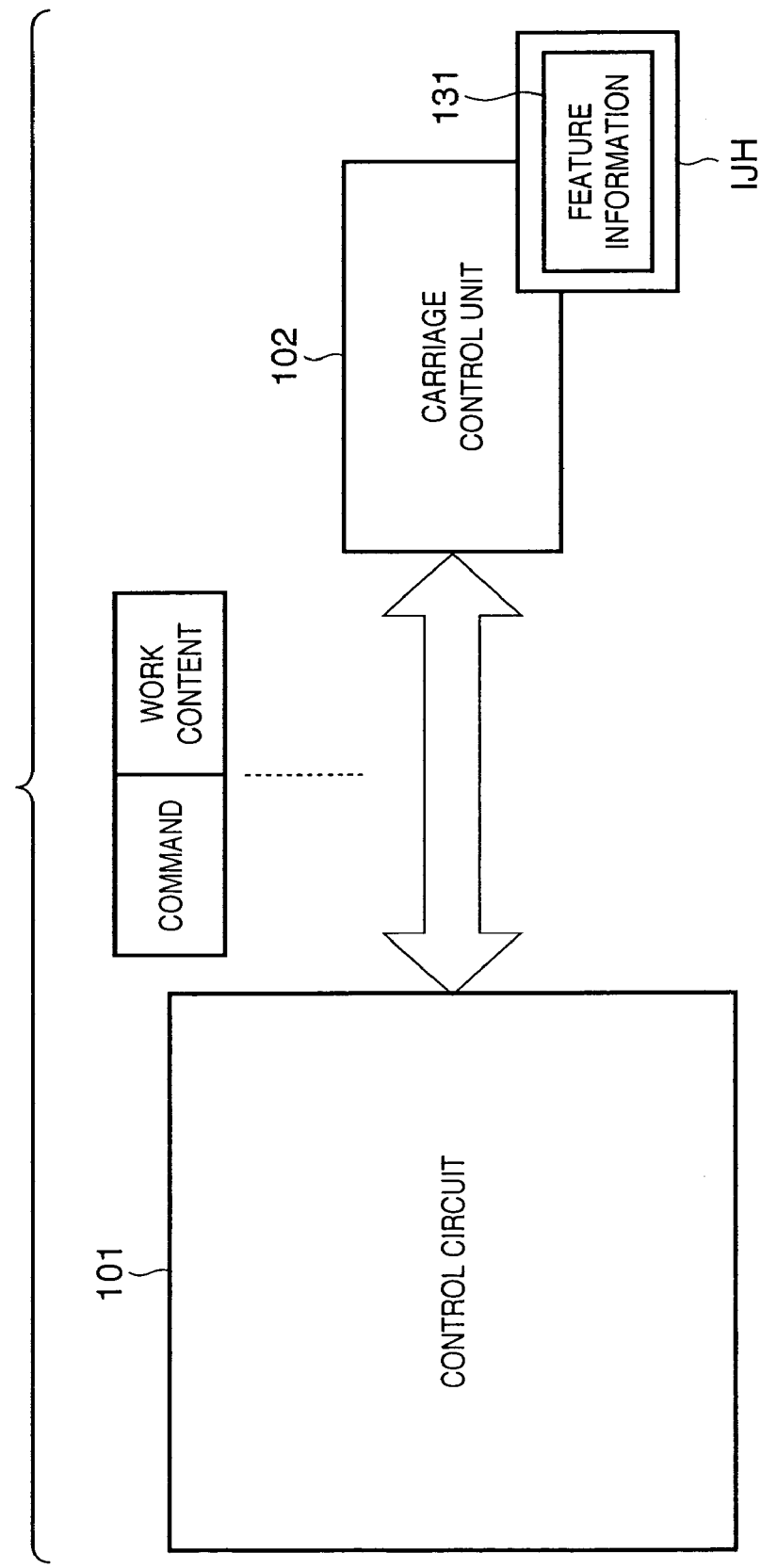
FIG. 3 is a block diagram showing a basic arrangement for acquiring feature information stored in the memory of a printhead according to the first embodiment of the present invention.

FIG. 3 is a block diagram showing a basic arrangement for acquiring feature information stored in the memory 131 of a printhead IJH according to the first embodiment of the present invention.

The printhead IJH comprises a printing element which performs printing in accordance with a received control command and an arrangement which outputs various pieces of feature information on printing. Similar to the prior art, the printhead IJH is mounted on the carriage HC and electrically connected to it. The printhead IJH and carriage HC can be electrically connected by various methods such as a contact pad having a gold-plated terminal. A carriage control unit 102 in the carriage HC can selectively read out printhead feature information from the printhead IJH in accordance with a control command sent from the main body control unit. This function of the carriage control unit 102 allows even a conventional printhead to acquire printhead feature information in accordance with a control command from the main body control circuit 101.

Figure 4:
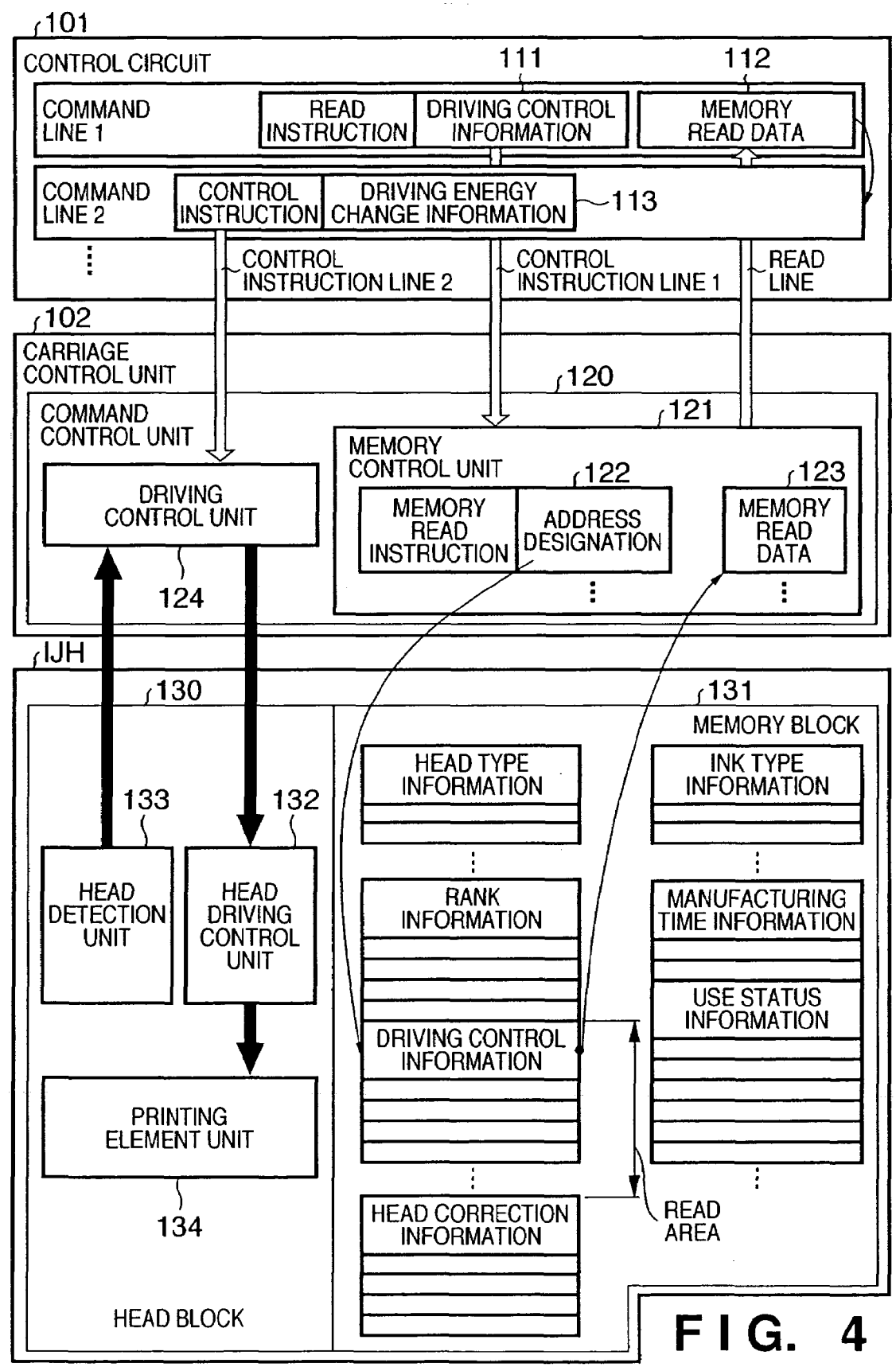
FIG. 4 is a schematic block diagram showing a control instruction communication system according to the first embodiment of the present invention.

FIG. 4 is a schematic block diagram showing a control instruction communication system according to the first embodiment.

Outline arrows represent control instruction line transmission, and black arrows represent general signal exchange. The first embodiment assumes, e.g., a sequence of issuing an instruction for acquiring printhead manufacturing variation information from the printhead (control instruction line 1), reading the manufacturing variation information from a predetermined area of the memory 131 in the printhead IJH as driving control information based on the instruction (read line), and correcting printing energy on the basis of the information (control instruction line 2). For example, the manufacturing variation information is information available to correct variations of printhead temperature sensor (FIG. 9) and the like.

If control instruction line 1 is executed in the control circuit 101 of the printing apparatus, the control circuit 101 sends a control instruction 111 for "reading out" "driving control information" of the printhead, to the carriage. In the carriage control unit 102, the control instruction 111 is received by a memory control unit 121. The memory control unit 121 reads out and acquires necessary information from a memory 131 of the printhead IJH in accordance with the received control instruction.

Figure 5:
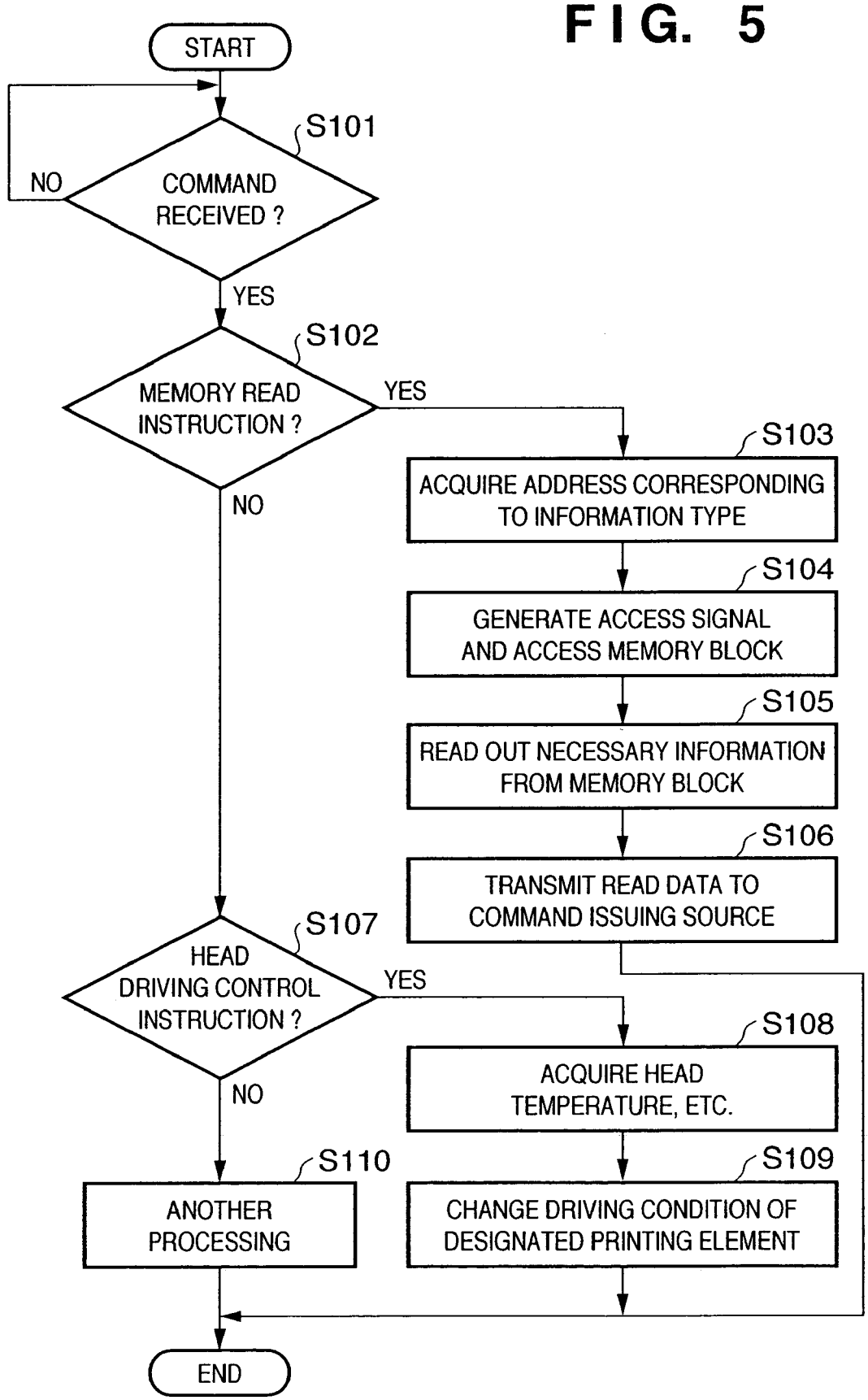
FIG. 5 is a flow chart for explaining a control instruction.

FIG. 5 is a flow chart for explaining the control instruction.

The operation of the command control unit 120 which has received the control instruction 111 will be explained with reference to the flow chart.

The command control unit 120 waits for transmission of a control instruction from the control circuit 101 in step S101, and if receives the control instruction 111, determines the type of control instruction (whether the control instruction is a memory read instruction) in step S102. If the received control instruction 111 is determined to be a memory read instruction, the processing advances to step S103 (the control instruction is transferred to the memory control unit 121 in FIG. 4). Processes in steps S103 to S106 are executed by the memory control unit 121.

In step S103, an address at which information designated by the control instruction 111 is stored is acquired among addresses in the nonvolatile memory (memory block 131) of the ink-jet head IJH. In the example of the first embodiment, an address at which driving control information is stored is acquired. In step S104, the command control unit 120 generates an access signal (memory read instruction+address) 122 to the memory 131 so as to read information from the address.

Information representing the correspondence between information and its storage address in the memory 131 is held as a table as shown in FIG. 6 by the memory control unit 121.

Accordingly, an address corresponding to information (information identification name) designated by the control instruction 111 is obtained by looking up the table, and a proper access signal 122 is generated as a control signal. In this example, read of driving control information is designated, and an access signal is so generated as to read information stored at addresses 0xSSSS to 0xTTTT. Driving control information is read out from the memory 131.

In order to cope with a plurality of types of printheads, a table as shown in FIG. 6 is prepared for each printhead, and an access signal is generated by looking up a table corresponding to a currently mounted printhead. A plurality of types of tables are stored in the memory of the memory control unit 121 in advance, and a table to be looked up is selected and used from head type information of the mounted printhead. In this case, the storage address of the head type information in the memory 131 must be common between all types of printheads. Alternatively, a table as shown in FIG. 6 may be stored at a predetermined address in the memory of the printhead, and read out and held by the command control unit 120 upon mounting the printhead (or powering on the apparatus).

In this way, in step S104, the memory control unit 121 generates an access signal by using the address acquired in step S103, and accesses the memory block 131 in accordance with the access signal 122. Thus, only necessary information can be read from the memory. Then in step S105, the memory control unit 121 reads out the information (driving control information) designated by the control instruction 111, and acquires the information as memory read data 123. In step S106, the acquired memory read data 123 is sent to the control circuit 101 which has issued the control instruction 111 (read line), as the execution result (memory read data 112) of control instruction.

In the above example, the carriage control unit 102 sends back the read printhead driving control information to the control circuit 101. The driving control information may be utilized for feedback control in the carriage control unit 102. When the control system must control driving in real time, control is completed by only the carriage control unit 102, thereby quickly controlling the printhead. This example will be described in the second embodiment.

At the end of control instruction line 1 by the control circuit 101, control instruction line 2 is executed in accordance with the sequence. In control instruction line 2, "driving energy change information" is transferred as a "control instruction". More specifically, driving energy change information is generated on the basis of the memory read data 112 (driving control information) acquired by control instruction line 1. A command 113 of changing driving control of the printing element is generated in accordance with the driving energy change information.

In this processing, if reception of a command is confirmed in step S101, the received command is determined in step S102 not to be a memory read instruction. The processing advances to step S107 to determine whether the received command is a head driving control instruction.

If the command control unit 120 of the carriage control unit 102 determines that the control instruction 113 has been received, the processing advances from step S107 to step S108. Steps S108 and S109 are executed by a driving control unit 124. The driving control unit 124 changes energy in accordance with the driving energy change information of the control instruction 113, and transmits the instruction to a head driving control unit 132. Optimal driving of each printing element in a printing element unit 134 can therefore be achieved.

If another control instruction is received, the processing advances to step S110 to execute corresponding processing. For example, the cumulative driving count of the printing element may be written in the memory at a specific timing, or the information may be properly read out to perform head driving optimal for the cumulative driving count. Several control operations by memory access are conceivable, but a description of these processes will be omitted.

Figure 7:
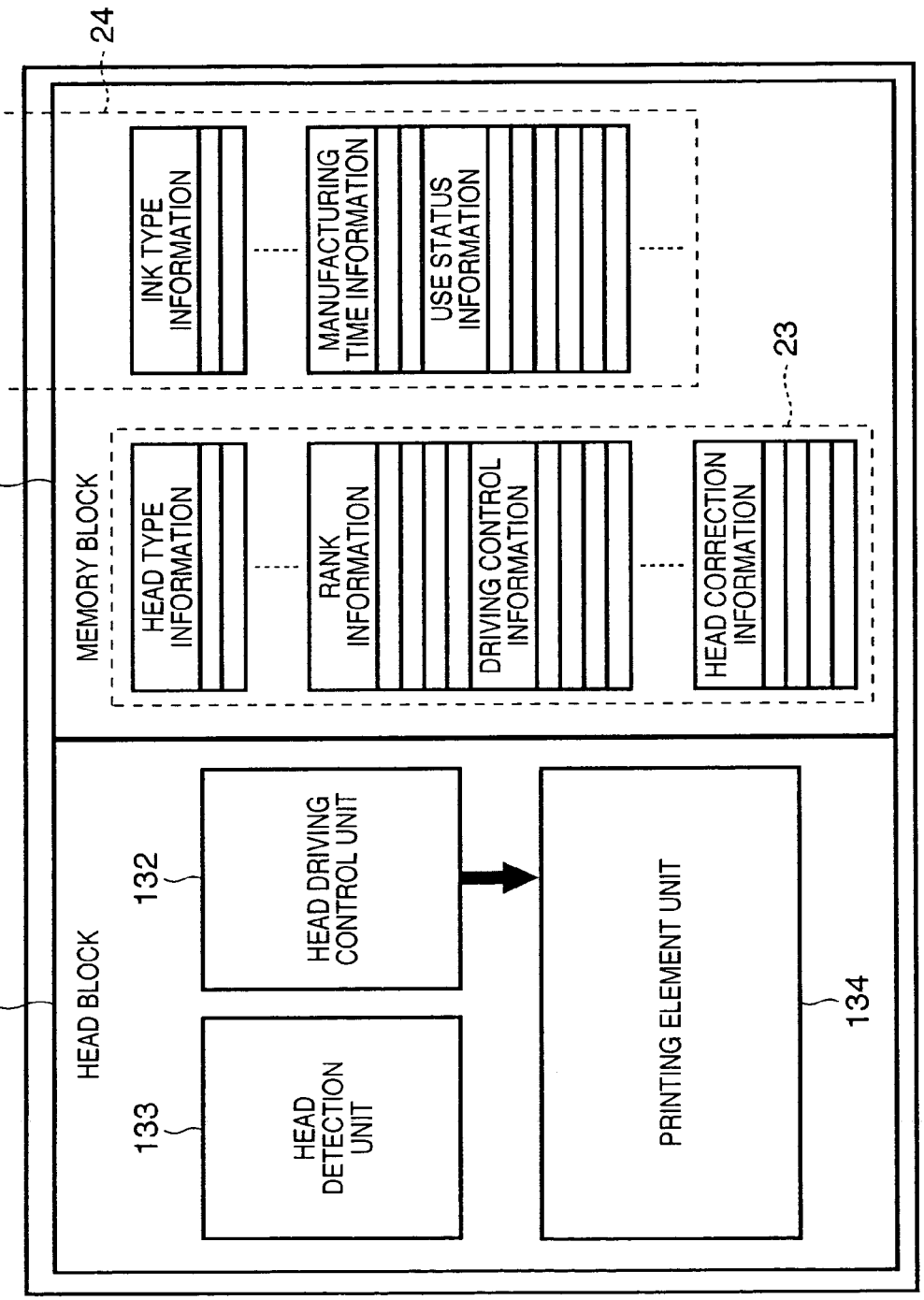
FIG. 7 is a block diagram for explaining the arrangement of a printhead applicable to the first embodiment of the present invention.

FIG. 7 is a block diagram for explaining the arrangement of a printhead applicable to the first embodiment.

As shown in FIG. 7, the printhead IJH is divided into a head block 130 and the memory block 131. Part or all of the memory may be integrated into the same board of the head block 130. When the memory capacity of the memory block 131 is large, the memory block 131 may be mounted separately from the head block 130. The head block 130 incorporates the printing element unit 134, the head driving control unit 132, and a head detection unit 133.

As will be described later with reference to FIG. 8, the printing element unit 134 has a plurality of printing elements 1 which are in one-to-one correspondence with circuit elements (to be described later with reference to FIG. 9) in the head driving control unit 132.

As will be described later with reference to FIG. 9, the head detection unit 133 incorporates a printhead temperature sensor 12 and a resistance element 11 for correcting and monitoring proper application energy to the printhead (resistance element for monitor). When control relating to detection of the sensor is completed, the head detection unit 133 may include a control circuit which functions these units. For an arrangement capable of outputting logic, an arrangement 10 may be included.

Referring to FIG. 7, in the memory block 131, reference numeral 23 denotes a printhead memory block which holds printhead data in correspondence with an individual address. For example, the contents of the memory block 23 are manufacturing variation information on the printing element in the printing element unit 134 or the temperature sensor in the head detection unit 133, manufacturing time information containing a printhead manufacturing date, printhead structure information, and a printhead printing dot count value (rewritable). Reference numeral 24 denotes a memory block for storing information relating an ink-tank individually separated from the printhead, ink type information, manufacturing time information, use status information and the like.

Figure 8:
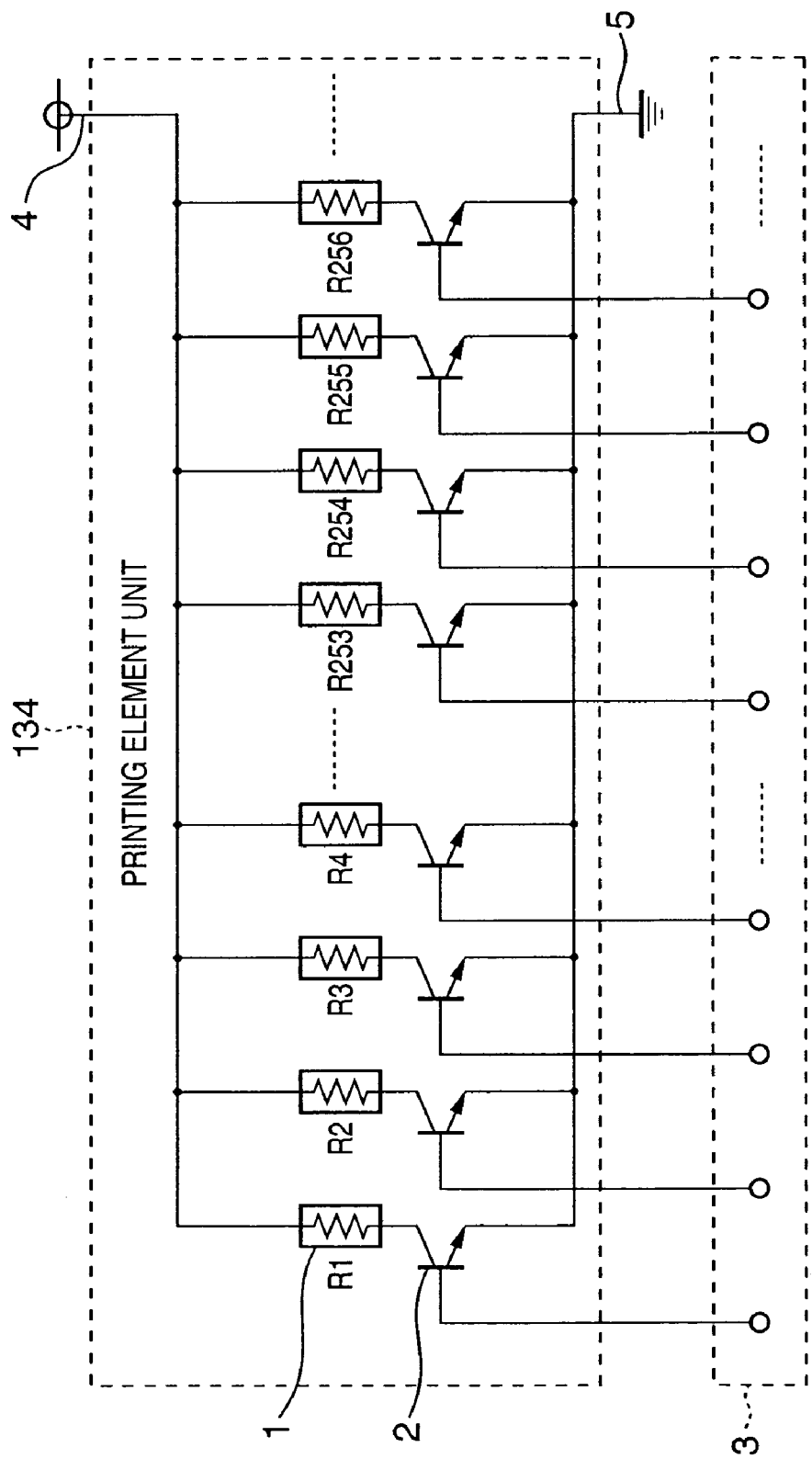
FIG. 8 is a circuit diagram showing a concrete example of a circuit arrangement in which a plurality of printing elements for discharging ink by using heat and performing printing are driven in time division for each block.
Figure 9:
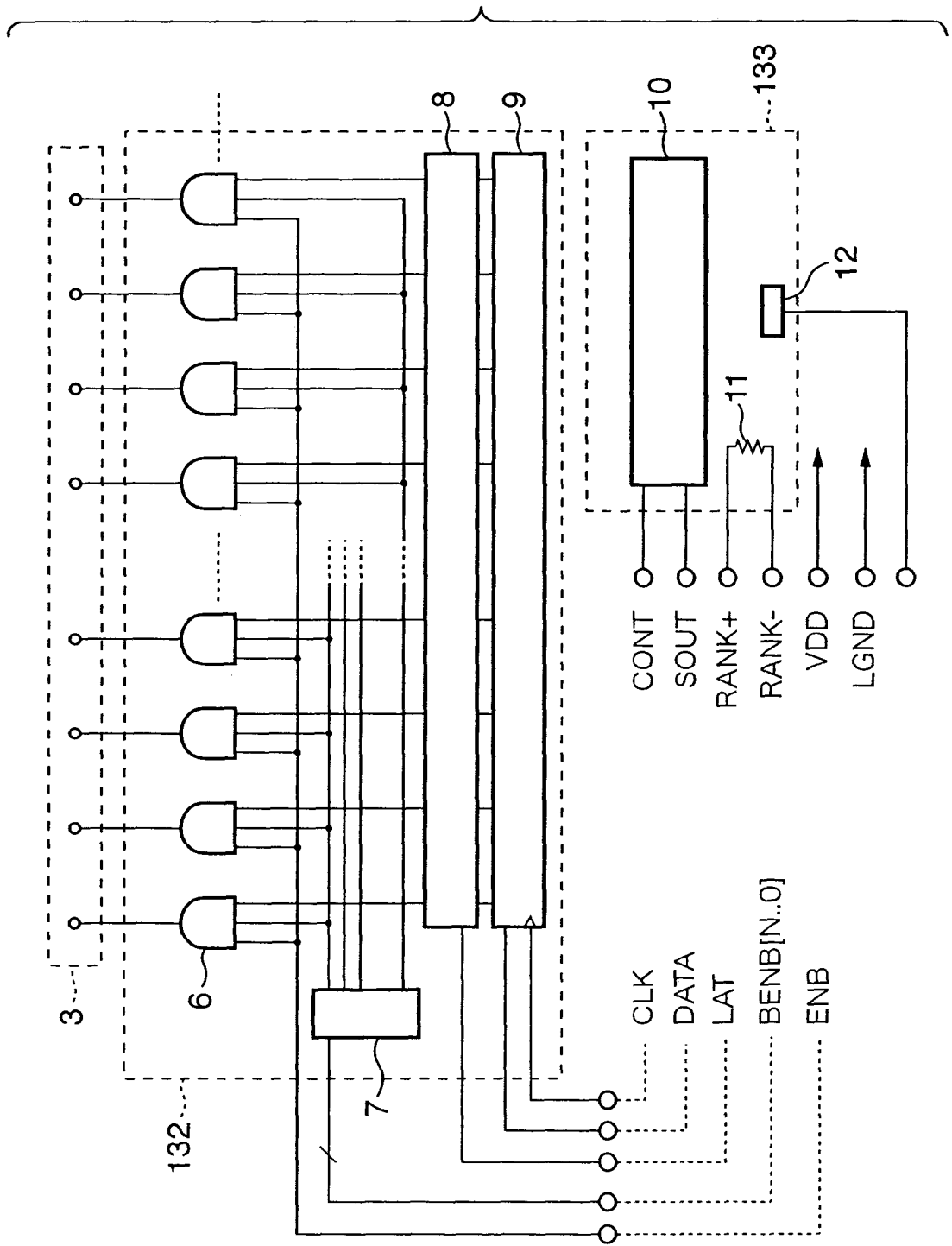
FIG. 9 is a circuit diagram showing a concrete example of another circuit arrangement in which a plurality of printing elements for discharging ink by using heat and performing printing are driven in time division for each block.
Figure 10:
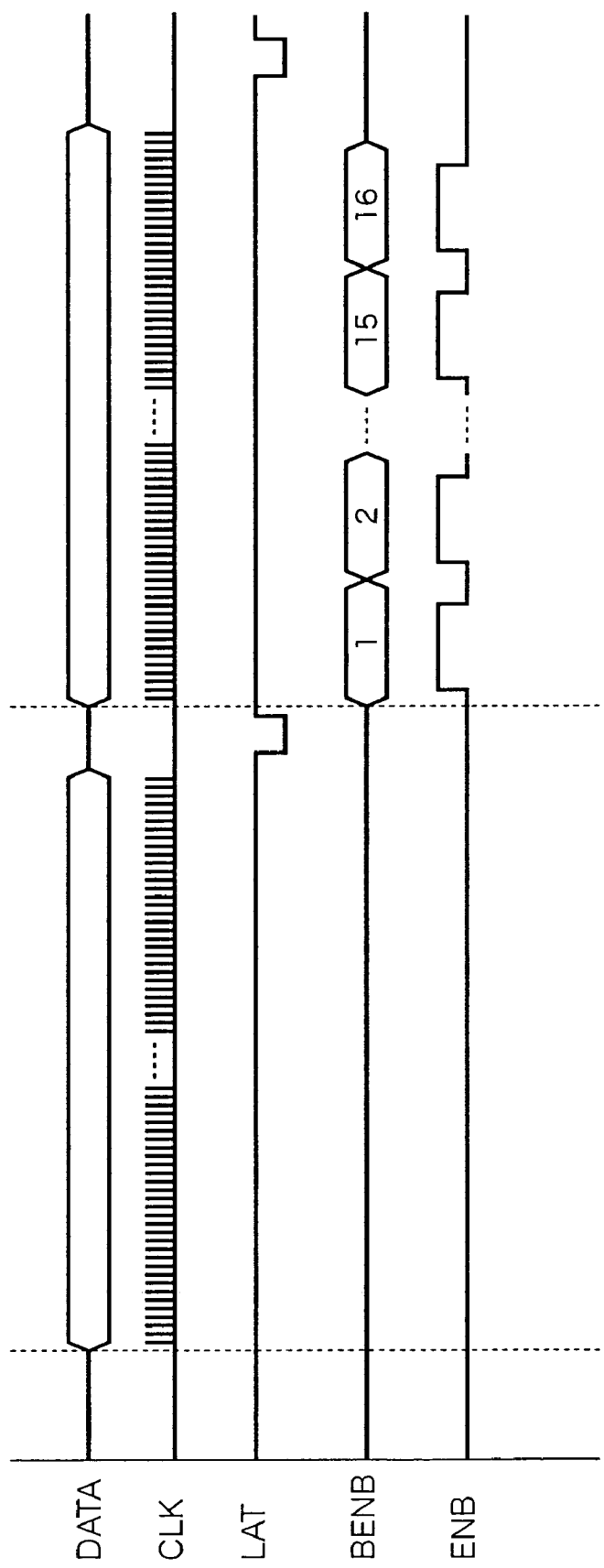
FIG. 10 is a timing chart showing a signal input to the circuit shown in FIG. 9.

FIGS. 8 and 9 are circuit diagrams showing a concrete example of circuit arrangements in which printing elements for performing printing by ejecting ink by using heat are driven in time division for each block. FIG. 10 is a timing chart showing a signal input to the circuit shown in FIG. 9.

In FIG. 8, reference numeral 1 denotes an electrothermal transducer such as a heater arranged as a printing element; 2, a function element such as a transistor or FET which controls the ON state of the electrothermal transducer; 3, an electrical node between the function element and the control circuit; 4, a power supply line; and 5, a ground line.

In the control unit of FIG. 9, reference numeral 6 denotes an AND circuit which outputs a control signal of the function element 2; 7, a decoder; 8, a latch; and 9, a shift register. Reference symbol CLK denotes a clock signal; DATA, an image data signal; LAT, a latch pulse; BENB, a block selection signal; and ENB, a driving pulse signal. When the image data signal DATA is input, image data are sequentially transferred to the shift register 9 in response to the image data transfer clock CLK, and aligned in the latch 8 in correspondence with respective printing elements.

As shown in FIG. 10, the block selection signals BENB are sequentially activated within the cycle of the latch pulse signal LAT, and as a result, time division driving can be achieved. If the block selection signals BENB are distributed and connected to printing elements, distributed driving is executed.

In a printing apparatus having various printing modes, the pattern of the block selection signals BENB input to the decoder 7 in the cycle of the latch pulse signal LAT may not be kept constant but may be changed depending on the printing mode. In this case, printing elements can be driven with various patterns by a combination with other control signals.

As the above-described circuit arrangement, many circuit arrangements have been proposed in accordance with the printing element driving method. In order to minimize the circuit arrangement, the circuit may be comprised of a latch circuit, and shift registers which can sequentially drive blocks obtained by grouping printing elements into several blocks. For a long printhead in which image data is transferred in advance and the divisional driving order can be arbitrarily set in the next cycle, the circuit may preferably comprise a latch circuit, and shift registers corresponding to printing elements. The divisional control circuit 7 is a circuit such as a decoder or shift register.

According to the first embodiment, since direct access to the memory is adopted, a parameter can be acquired from the printhead within a short time in feeding back printhead-specific information stored in the printhead to the printing apparatus main body and executing printing control.

In the second embodiment to be described below, the control circuit 101 of the printing apparatus can concentrate on only transfer of image data by controlling driving by the internal register of the carriage even during printing.

Second Embodiment

Figure 11:
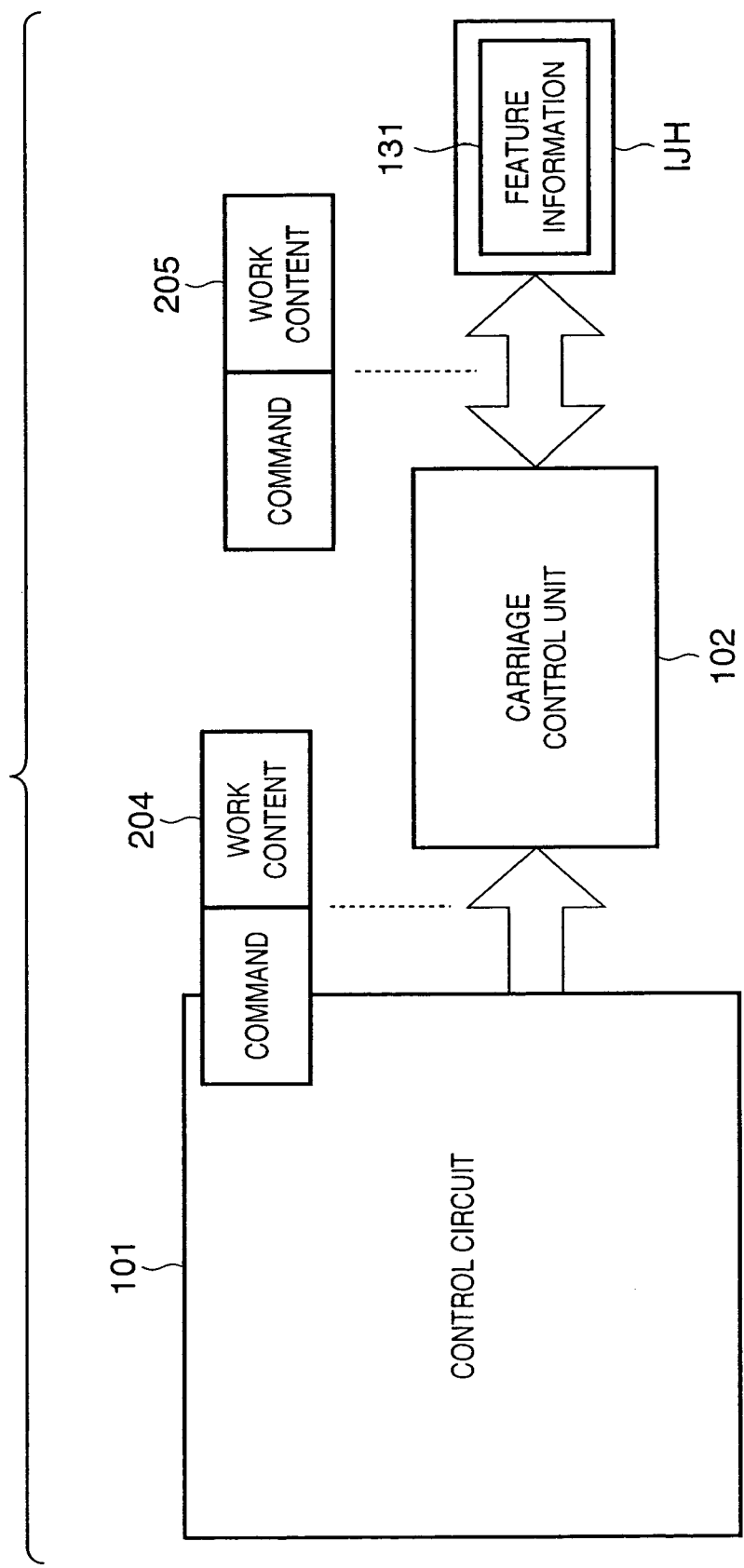
FIG. 11 is a block diagram showing a basic arrangement for acquiring feature information stored in the memory of a printhead according to the second embodiment of the present invention.

FIG. 11 is a block diagram showing a basic arrangement for acquiring feature information stored in the memory 131 of a printhead IJH according to the second embodiment.

In the first embodiment (FIG. 3), the control circuit 101 of the printing apparatus generates the read command 111 and control command 113. In the second embodiment, a carriage control unit 202 generates a read command. That is, according to the second embodiment, an instruction 204 transferred from the control circuit in the main body of the printing apparatus is minimum. The carriage control unit 102 generates a read command on the basis of the instruction, and transfers a detailed instruction 205 to the printhead IJH. The printhead IJH according to the second embodiment comprises a command control unit 120 which reads out various pieces of feature information from the memory 131 in accordance with the detailed instruction 205, and drives and controls the printing element unit 134.

The carriage control unit 102 according to the second embodiment generates read command in accordance with the instruction 204 sent from the control circuit 101 of the main body of the printing apparatus, and selectively transfers a detailed instruction to the printhead IJH.

Figure 12:
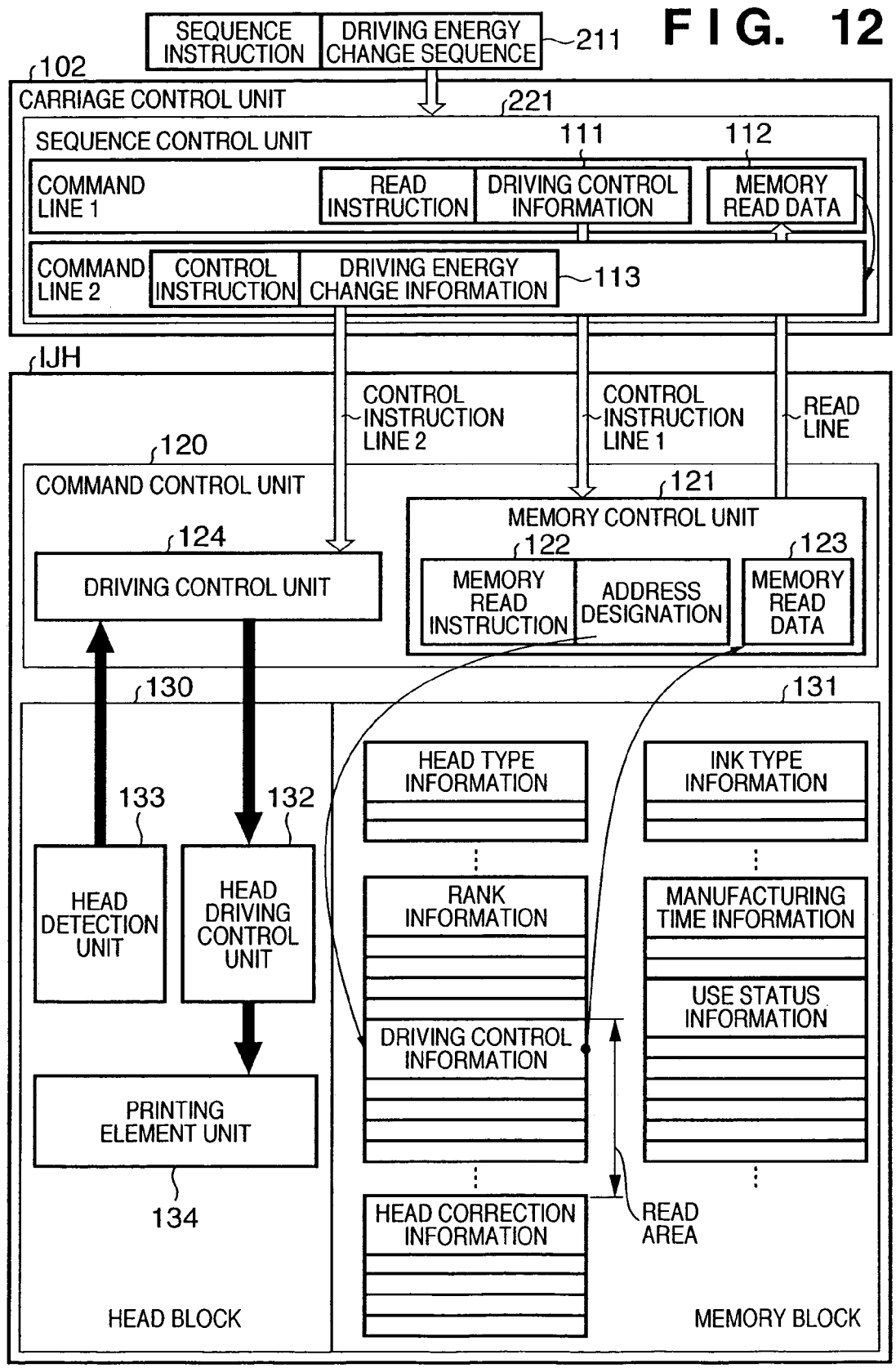
FIG. 12 is a schematic block diagram showing a control instruction communication system according to the second embodiment of the present invention.

FIG. 12 is a schematic block diagram showing a control instruction communication system according to the second embodiment.

The same reference numerals as those in the arrangement described in the first embodiment (FIG. 4) denote parts having the same functions. As indicated from FIGS. 4 and 12, a command control unit 120 which is arranged in the carriage control unit 102 in the first embodiment is arranged in the printhead IJH. The carriage control unit 102 has a sequence control unit 221.

A control instruction 211 from the control circuit 101 in the main body of the printing apparatus is a minimum instruction (corresponding to the control instruction 204 in FIG. 11). The minimum control instruction 211 is a sequence instruction representing the sequence of a plurality of control instructions.

When the control instruction 211 is transferred to the carriage control unit 102, the sequence control unit 221 executes a control instruction line in accordance with the control instruction. For example, the sequence control unit 221 executes, e.g., control instruction lines 1 and 2 (FIG. 4) described in the first embodiment. Since the format of the sequence control instruction is defined by the same format as that of a general control instruction line, the sequence control instruction can be added in accordance with the function.

In the second embodiment, a minimum control instruction is supplied to the carriage control unit, and only the carriage control unit 102 can complete processing of the instruction. Particularly when the printhead must be driven and controlled in real time, this is an effective function, and the printhead can be quickly controlled.

Figure 13:
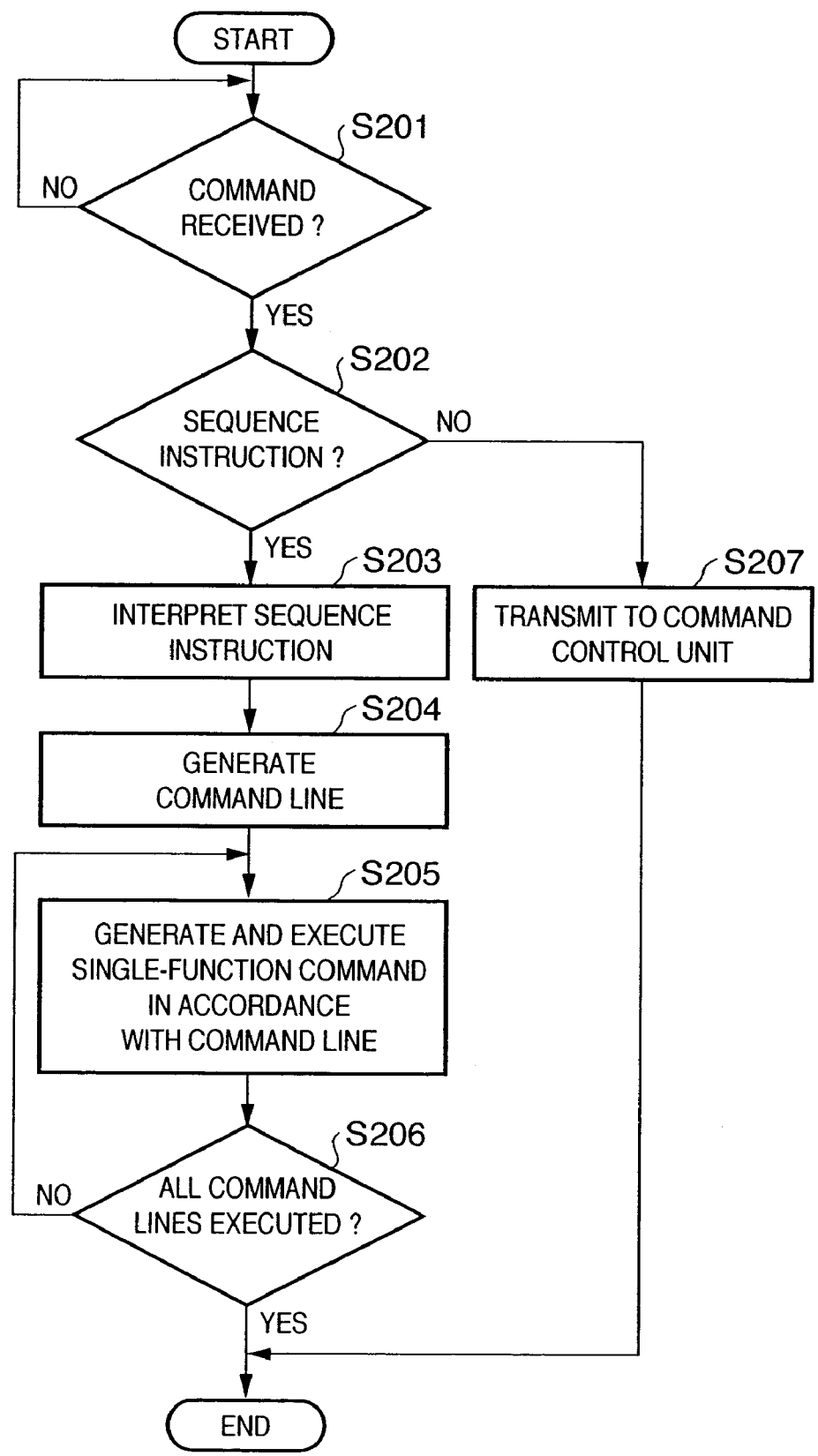
FIG. 13 is a flow chart for explaining the operation of a sequence control unit 221 according to the second embodiment of the present invention.

FIG. 13 is a flow chart for explaining the operation of the sequence control unit 221.

In step S201, the sequence control unit 221 waits for reception of a control instruction from the control circuit 101 of the printing apparatus main body, and if receives a control instruction, the processing advances to step S202 to determine whether the control instruction is a sequence instruction. If NO in step S202, the processing advances to step S207 to directly transmit the control instruction to the command control unit 120.

If YES in step S202, the processing advances to step S203 to interpret the sequence instruction, and control instruction (command) lines are generated in step S204. In steps S205 and S206, the control instruction lines are sequentially executed.

In the example of the second embodiment shown in FIG. 12, two command lines (control instruction lines 1 and 2) are generated and executed in accordance with the control instruction 221 (driving energy change sequence instruction). An example of sequentially executing the two command lines will be explained in detail as a concrete execution example of steps S205 and S206.

If the sequence control unit 221 of the carriage control unit 102 executes control instruction line 1, the sequence control unit 221 sends a control instruction 111 for "reading out" "driving control information" of the printhead IJH. As described in the first embodiment, upon reception of the control instruction 111, a memory control unit 121 of the command control unit 120 of the printhead IJH generates a memory access signal 122 so as to read driving control information stored in a memory 131 of the printhead IJH. The memory control unit 121 stores a table as shown in FIG. 6 that corresponds to the memory 131 in the printhead IJH.

Note that, according to the second embodiment, the memory control unit 121 is arranged in the printhead IJH, and suffices to have a table corresponding to its memory. Unlike the first embodiment, the table need not be updated in, e.g., exchanging the printhead, or a plurality of types of tables need not be held.

The memory control unit 121 accesses the memory 131 in accordance with the access signal (memory read command) 122. The memory 131 in the printhead IJH outputs driving control information to the memory control unit 121 in response to reception of the access signal. The memory control unit 121 reads out the information (driving control information) designated by the control instruction 111 from the memory 131, and acquires the information as memory read data 123. The acquired memory read data 123 is sent as the execution result (memory read data 112) of command line 1 to the carriage control unit 202.

At the end of control instruction line 1, the carriage control unit 102 executes a control instruction line 2 in accordance with the sequence instruction. In control instruction line 2, "driving energy change information" is transferred as a "control command" to the printhead IJH. More specifically, the carriage control unit 102 generates driving energy change information on the basis of the memory read data 112 (driving control information) acquired by control instruction line 1. Then, the carriage control unit 102 generates control instruction 113 of changing driving control of the printing element.

Similar to the first embodiment, if the command control unit 120 of the printhead IJH receives a control instruction 113, a driving control unit 124 changes printing energy of each printing element, and transmits the instruction to a head driving control unit 132. As a result, optimal driving of each printing element in a printing element unit 134 is achieved.

According to the above-described embodiment, driving control of the printhead can be executed between only the carriage control unit and the printhead, and the printing apparatus main body only transmits a sequence instruction to the carriage control unit at the beginning. By supplying a minimum control instruction to the carriage control unit, only the carriage control unit can complete processing of the instruction. When, for example, the printhead must be driven and controlled in real time, the printhead can be quickly controlled.

Since driving is controlled within the carriage, the control circuit 101 of the printing apparatus can concentrate on only transfer of image data even during printing.

In the second embodiment, the sequence control unit 221 is arranged in the carriage, and the command control unit 120 is arranged in the printhead. However, the present invention is not limited to this. As will be described in the third embodiment, both the sequence control unit 221 and command control unit 120 may be arranged in the carriage or printhead.

Third Embodiment

Figure 14:
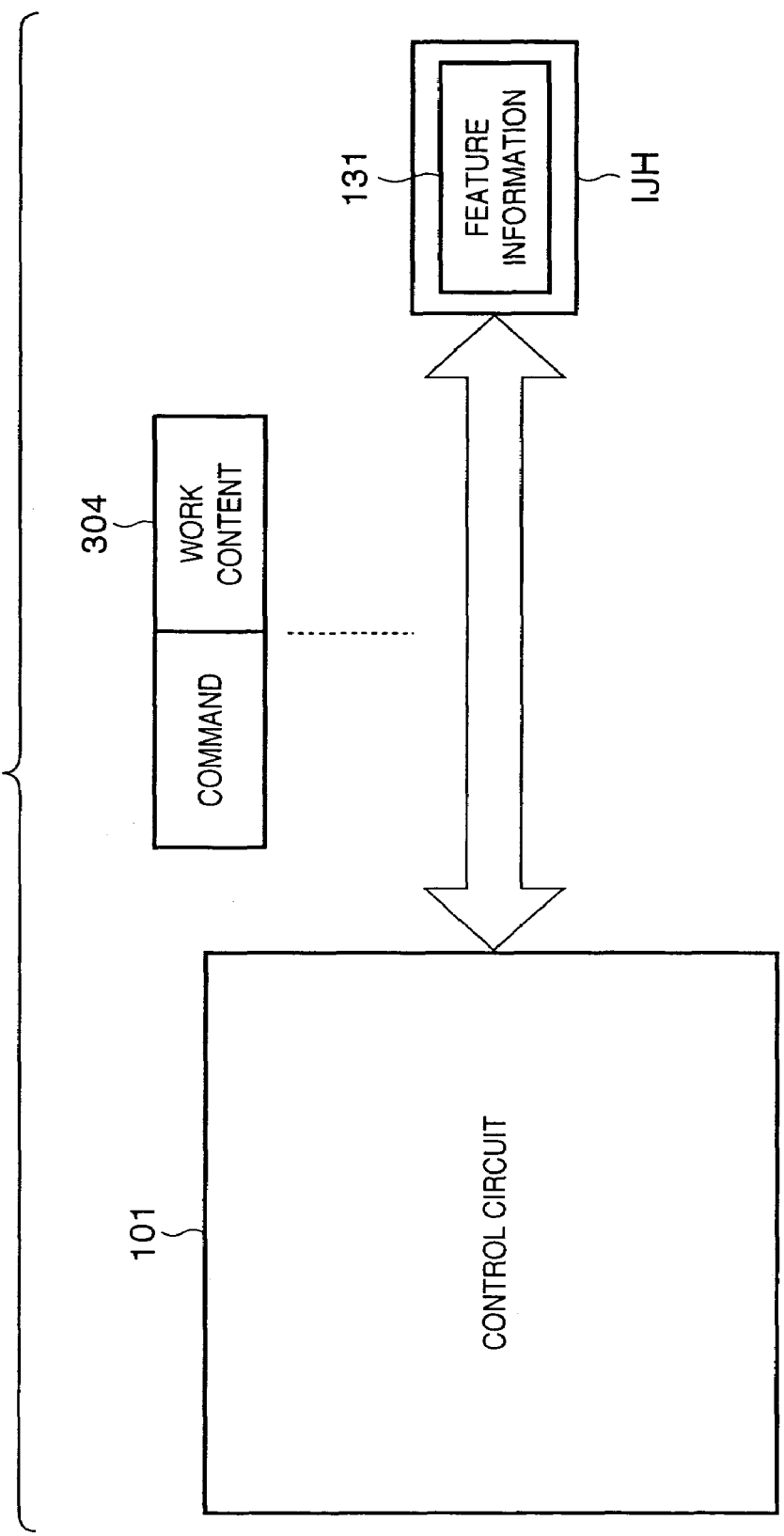
FIG. 14 is a block diagram showing a basic arrangement for acquiring feature information stored in the memory of a printhead according to the third embodiment of the present invention.

FIG. 14 is a block diagram showing a basic arrangement for acquiring feature information stored in a memory 131 of a printhead IJH according to the third embodiment. In FIG. 14, the same reference numerals as those described in the first and second embodiments with reference to FIGS. 3 and 11 denote the same parts.

The arrangement according to the third embodiment assumes the use of an advanced printhead which can most effectively utilize the present invention.

In the third embodiment, data sent from the control circuit 101 of the main body of the printing apparatus to a printhead IJH are only image data (not shown) and a minimum command 304. The printhead IJH according to the third embodiment comprises a command control unit 120 and a sequence control unit 221 which can expand a sequence command.

This form can be applied to a full line printhead used in a page printer or the like.

The control circuit 101 and printhead IJH are desirably electrically connected by a general connector or card edge type connector. In the arrangement according to the third embodiment, the sequence control unit 221 and command control unit 120 are arranged in the printhead. Arbitrary control can be completely achieved within the printhead in correspondence with a sequence command sent from the control circuit 101 in the main body of the printing apparatus.

Figure 15:
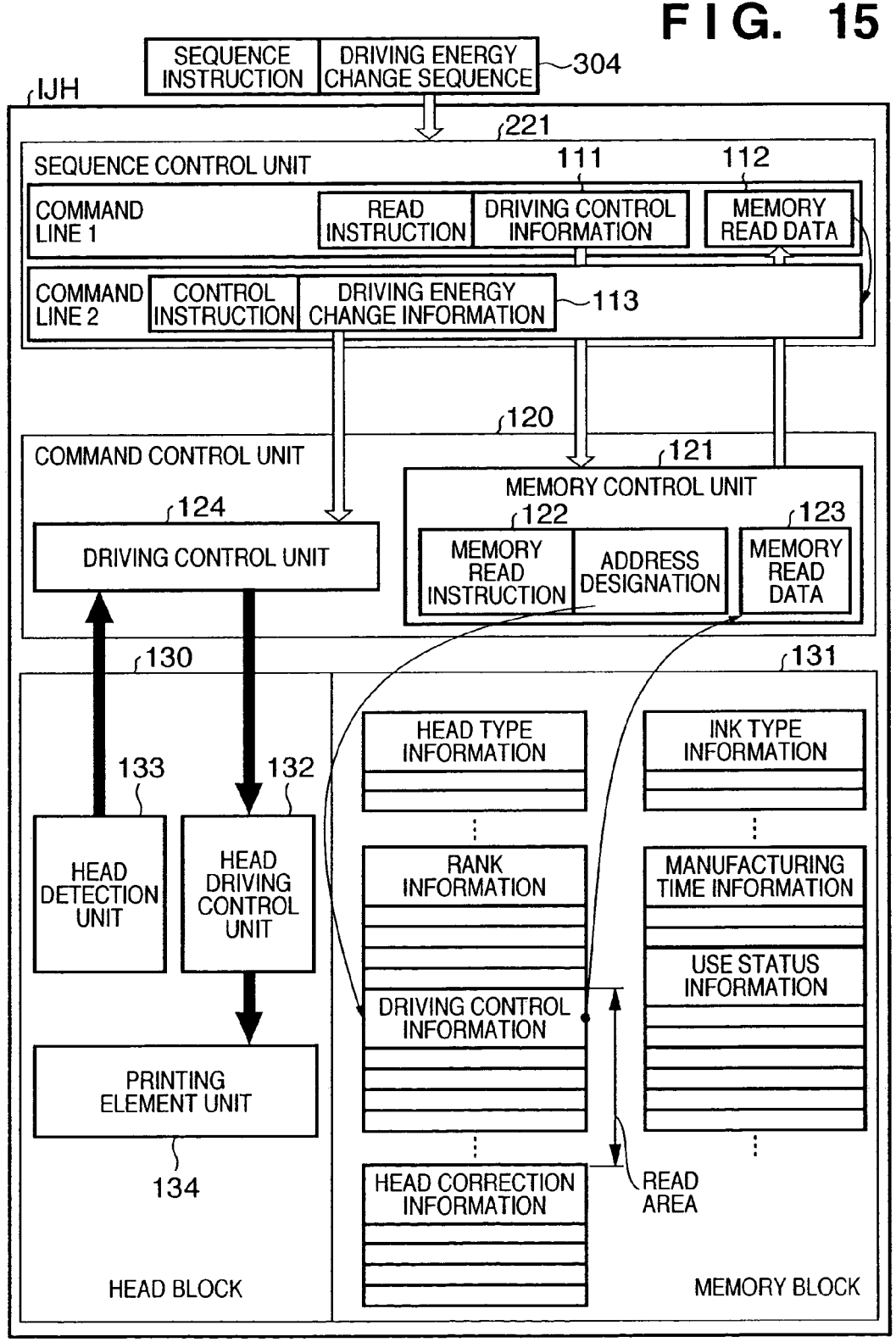
FIG. 15 is a schematic block diagram showing a control instruction communication system according to the third embodiment of the present invention.

FIG. 15 is a schematic block diagram showing a control instruction communication system according to the third embodiment.

In FIG. 15, the minimum command 304 is a sequence command obtained by sequencing a plurality of commands, and is directly transferred to the printhead IJH. For example, command lines 1 and 2 described in the second embodiment are executed within the printhead in accordance with the sequence command 304.

In FIG. 15, the sequence control unit 221 and command control unit 120 have the same functions as those described in the second or first embodiment, their operations are the same as those in the second embodiment, and a detailed description thereof will be omitted.

This sequence can be parallel-processed in accordance with the printhead function. For example, self-completion processing of monitoring a temperature change during driving of the printing element, when the temperature reaches a specific value, changing values of the register which set printing energy data, and driving and controlling the printing element can also be achieved. The control circuit in the main body of the printing apparatus suffices to send an arbitrary sequence command before transferring image data, and advanced control can be achieved by only a simple control command system.

Fourth Embodiment

Access to the memory mounted in the printhead has been explained. A memory may be mounted in an ink tank and accessed by the memory control unit 121. The fourth embodiment will explain such printhead.

Figure 16:
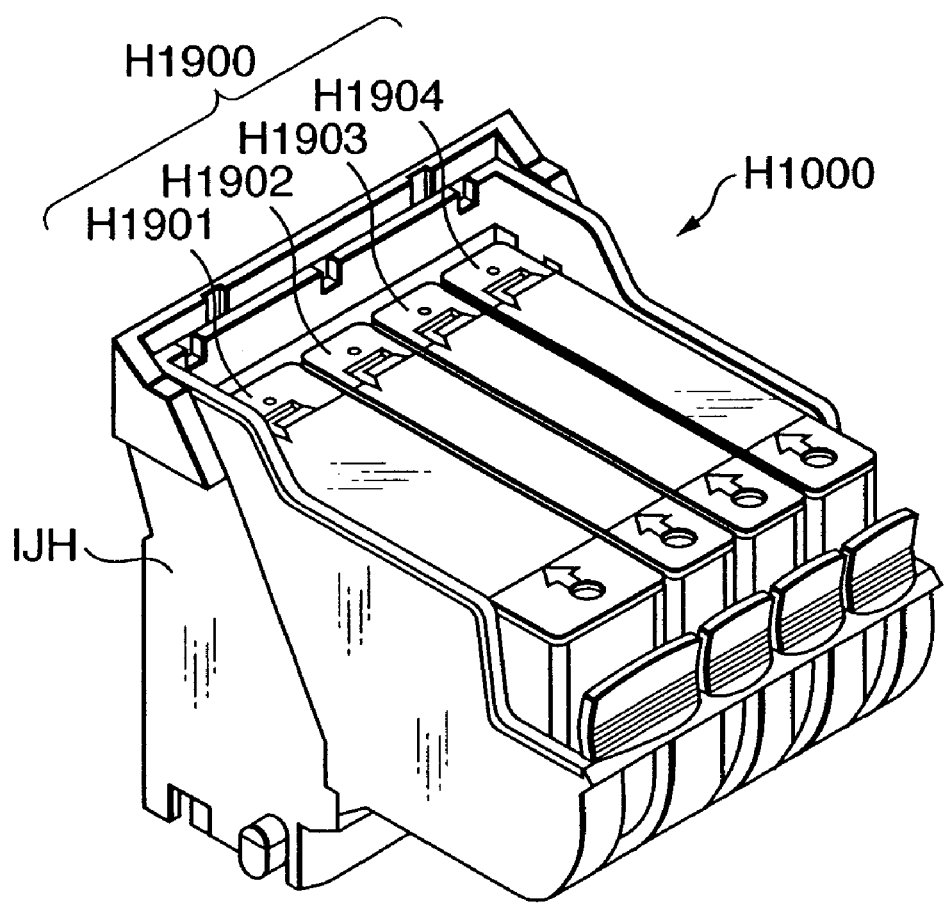
FIG. 16 is a view showing the outer appearance of a carriage and ink tank according to the fourth embodiment.

FIG. 16 is a view for explaining the mounting state of an ink tank H1900 on a printhead IJH which constitutes a printhead cartridge H1000. Ink tanks H1901, H1902, H1903, and H1904 store inks in different colors. Each ink tank has an ink supply port for supplying ink in the ink tank to the printhead IJH. Ink is supplied to a printing element base via the ink supply port. Ink is supplied to a bubbling chamber having an electrothermal transducer and orifice, and discharged to a printing sheet serving as a target printing medium by heat energy applied to the electrothermal transducer.

Figure 17:
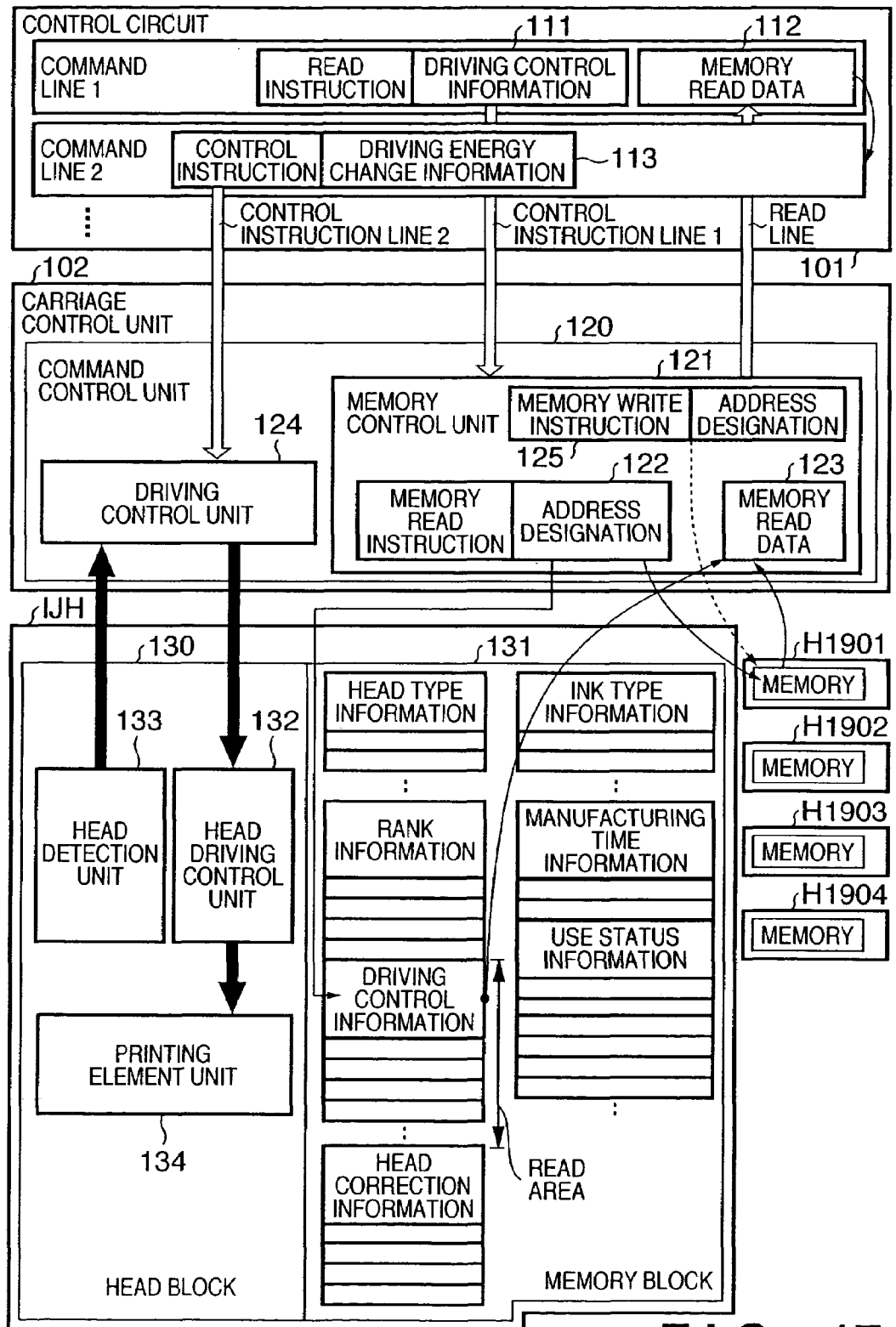
FIG. 17 is a block diagram for explaining access to the memory of the ink tank according to the fourth embodiment.

In the fourth embodiment, the ink tanks H1901, H1902, H1903, and H1904 individually comprise memories. FIG. 17 is a block diagram for explaining access to the memory in each ink tank. Electrical terminals which are connected to the memories arranged in the ink tanks H1901 to H1904 are connected to the electrical terminals of the printhead IJH when the ink tanks H1901 to H1904 are mounted on the print head IJH. This connection realizes electrical communication between a carriage control unit 102 and the memory of each ink tank via the printhead IJH.

A control circuit 101 can generate information on the ink use amount on the basis of data to be printed, or data based on the ink discharge amount. For example, the control circuit 101 can count the number of printing dots and generate a printing dot count value for each color corresponding to each ink tank. If the control circuit 101 issues to a memory control unit 121 an instruction of writing such printing dot count value in the memory of a corresponding ink tank, the memory control unit 121 executes a memory write instruction 125 which designates the memory address of each ink tank. The printing dot count value can be stored in the memory of a corresponding ink tank (H1901 to H1904) via the memory control unit 121. An accurate ink consumption amount can be held for each ink tank.

If the memory control unit 121 executes a memory read instruction 122 which designates the address of the memory of each ink tank, a printing dot count value which is stored in the memory of each ink tank as memory read data can be obtained. The user can know the accurate ink consumption amount of each ink tank.

The use log of the ink tank or the like can be stored in the memory of the ink tank. In replacement, display of the ink tank model or the like can be reliably done. With the use of the memory in the ink tank, the printing apparatus can perform control processes about various printing operations, providing a significant advantage to the user.

The memory access method of the fourth embodiment allows directly accessing only an arbitrary address at which necessary information is stored. This can prevent prolongation of a time required for printing operation of the printing apparatus, ink tank replacement processing, or the like.

The fourth embodiment has been described using an arrangement complying with the first embodiment, but can also be applied to the arrangements of the second and third embodiments.

In the above-described embodiments, various pieces of information may be stored in a nonvolatile memory. The memory of the ink tank may be a nonvolatile memory.

As described above, the first to fourth embodiments attain the following effects.

(1) Only necessary feature information can be extracted by the printing apparatus from pieces of feature information held by the printhead. The time taken to extract information can be shortened, compared to the prior art in which all pieces of information are extracted from the printhead.

(2) A control unit having an arrangement in which the contents of a command from the control circuit in the printing apparatus main body are interpreted and the memory of each printhead is accessed to acquire necessary information is arranged in the carriage separately from the control circuit or in the printhead. When the printing apparatus is to extract information from the printhead, a command is transmitted to the carriage control unit or printhead control unit to acquire necessary information from the printhead. This arrangement makes it possible to reliably acquire only information necessary for the printing apparatus main body even in the use of a printhead having a different memory specification or different feature information storage address. The degree of freedom of the printhead memory design also increases.

The command control unit adopted to implement an arrangement in which a command from the printing apparatus is interpreted and necessary data is acquired can be arranged in the carriage of the printing apparatus, similar to the second embodiment, the printhead, similar to the third embodiment, or the element base which constitutes the printhead (element base having a heating element).

As described in detail above, according to the embodiment, printhead control by the printing apparatus main body can be simplified into command communication even for complicated driving control accompanying the improvement of the printhead function. Processing can be completed within a short time because, for example, even access to the memory which is arranged in the printhead and holds pieces of information can be controlled by accessing, reading out, and referring to arbitrary information. These control operations can be executed in parallel with another processing, greatly shortening the conventional printhead control time.

The arrangement according to each embodiment is achieved by setting a command format corresponding to the printhead. The command format functions as a control line which links the printhead and the printing apparatus supporting the printhead. In the use of a conventional printhead, the carriage control unit controls a command from the control unit of the printing apparatus main body in accordance with the purpose, which provides a command format system.

Even if the printhead is further advanced, the advanced printhead can be exploited by adding a command format corresponding to the advanced function. The command system is held, and a conventional command can be kept utilized. More advanced control can also be realized using a sequence command which is a combination of commands.

Control according to the present invention can be applied regardless of the electrical/mechanical arrangement, software sequence, and the like as long as the present invention provides an arrangement which links the printing apparatus, carriage control unit, and print head by command communication.

The above embodiments have been explained by assuming that a droplet discharged from a printhead is ink and a liquid contained in an ink tank is ink. However, the content of the ink tank is not limited to ink. For example, the ink tank may contain a processing solution to be discharged onto a printing medium to increase the fixing properties, water resistance, or quality of a printed image.

The above-described embodiments have exemplified an ink-jet printing apparatus. However, the present invention can also be applied to another type of printing apparatus such as a thermal printing apparatus.

The above embodiments can increase the density and resolution of printing by using a system which includes a means (e.g., an electrothermal transducer or laser beam) for generating heat energy as energy used to discharge ink and causes a state change of ink by this heat energy, among other inkjet printing systems.

As the typical arrangement and principle, it is preferable to use the basic principle disclosed in, e.g., U.S. Pat. Nos. 4,723,129 and 4,740,796. This system is applicable to both a so-called on-demand apparatus and continuous apparatus. The system is particularly effective in an on-demand apparatus because at least one driving signal which corresponds to printing information and gives a rapid temperature rise exceeding nucleate boiling is applied to an electrothermal transducer which is arranged in correspondence with a sheet or channel holding a liquid (ink), heat energy is generated by the electrothermal transducer to effect film boiling on the heat acting surface of the printhead, and consequently a bubble can be formed in the liquid (ink) in one-to-one correspondence with the driving signal. The liquid (ink) is discharged from an orifice by growth and shrinkage of this bubble, forming at least one droplet. This driving signal is more preferably a pulse signal because growth and shrinkage of a bubble are instantaneously appropriately performed to discharge the liquid (ink) with a good response characteristic.

This pulse driving signal is preferably a signal described in U.S. Pat. Nos. 4,463,359 or 4,345,262. Note that superior printing can be performed by the use of conditions described in U.S. Pat. No. 4,313,124 which is the invention concerning the rate of temperature rise on the thermal action surface.

The above embodiments concern a serial type printing apparatus which scans a printhead to perform printing. The printing apparatus may be a full-line type printing apparatus using a printhead having a length corresponding to the width of a printing medium. The full-line type printhead can take a structure which attains this length by combining a plurality of printheads as disclosed in the above-mentioned specifications, or can be a single integrated printhead.

In addition, it is possible to use not only a cartridge type printhead explained in the above embodiments in which an ink tank is integrated with a printhead itself, but also an interchangeable chip type printhead which can be electrically connected to an apparatus main body and supplied with ink from the apparatus main body when attached to the apparatus main body.

It is preferable to add a printhead recovery means or preliminary means to the arrangement of the printing apparatus because printing operation can further stabilize. Concrete examples of the additional means are a capping means for the printhead, a cleaning means, a pressurizing or suction means, an electrothermal transducer, another heating element, and a preliminary heating means as a combination of the electrothermal transducer and heating element. A pre-discharge mode in which discharge is performed independently of printing is also effective for stable printing.

The printing mode of the printing apparatus is not limited to a printing mode using only a main color such as black. The apparatus can adopt at least either of a composite color mode using different colors and a full color mode using color mixture, regardless of whether the printhead is an integrated head or a combination of a plurality of heads.

The above embodiments assume that ink is a liquid. It is also possible to use ink which solidifies at room temperature or less and softens or liquefies at room temperature. A general inkjet system performs temperature control such that the viscosity of ink falls within a stable discharge range by adjusting the ink temperature within the range of 30° C. (inclusive) to 70° C. (inclusive). Hence, ink need only be a liquid when a printing signal used is applied to it.

The printing apparatus according to the present invention can take the form of any of an integrated or separate image output terminal of an information processing apparatus such as a computer, a copying apparatus combined with a reader or the like, and a facsimile apparatus having a transmission/reception function.

As has been described above, according to the present invention, necessary information can be efficiently extracted at a high speed from information held by a printhead.

Also, the degree of freedom of using a memory mounted in the printhead can be increased.

As many apparently widely different embodiments of the present invention can be made without departing from the spirit and scope thereof, it is to be understood that the invention is not limited to the specific embodiments thereof except as defined in the claims.

What is claimed is:

1. A method of controlling a printing apparatus which performs printing by using a printhead having a printing element and a storage unit, the printing apparatus including a first control unit which controls operation of the printing apparatus, and a second control unit which can operate independently of the first control unit, the method comprising:

an instruction generation step of causing the first control unit to generate an instruction for acquiring specific information from information held by the storage unit of the printhead, the instruction including information designating an identification name of the specific information, that is independent from an address of the storage unit to be accessed;

an acquisition step of causing the second control unit to receive the instruction generated by the first control unit in the instruction generation step, generate an address for accessing the storage unit of the printhead based on the instruction, access the storage unit at the address, and acquire the specific information corresponding to the instruction; and a control step of causing the second control unit to drive and control the printhead on the basis of information which is generated on the basis of the specific information acquired in the acquisition step in order to drive the printhead, wherein the acquisition step includes a generation step of generating an access signal containing the address corresponding to the identification name designated by the instruction generated in the instruction generation step from the storage unit, and a read step of accessing the storage unit in accordance with the access signal generated in the generation step and reading out the specific information, wherein said generation step generates the access signal by looking up a table corresponding to the printhead mounted on the printing apparatus among a plurality of tables which are provided in correspondence with a plurality of types of printheads and makes identification names designated by the instruction and storage addresses of the storage unit correspond to each other.

2. The method according to claim 1, wherein the second control unit is arranged in a carriage which supports the printhead.

3. A printing apparatus which performs printing by using a printhead having a printing element and a storage unit, comprising:

instruction generation means for generating an instruction for acquiring specific information from information held by the printhead, the instruction including information designating an identification name of the specific information, that is independent from an address of the storage unit to be accessed;

acquisition means for receiving the instruction generated by said instruction generation means, generating an address based on the instruction, accessing the storage unit of the printhead based on the address, and acquiring the specific information corresponding to the instruction from the storage unit; and control means for driving and controlling the printhead on the basis of information which is generated on the basis of the specific information acquired by said acquisition means in order to drive the printhead, wherein said acquisition means includes generation means for generating an access signal containing the address corresponding to the identification name designated by the instruction generated by said instruction generation means from the storage unit, and read means for accessing the storage unit in accordance with the access signal generated by said generation means and reading out the specific information, wherein said generation means has, in correspondence with a plurality of types of printheads, a plurality of tables which make identification names designated by the instruction and storage addresses of the storage unit correspond to each other and generates the access signal by looking up a table corresponding to a printhead mounted on the printing apparatus among the plurality of tables.

4. The apparatus according to claim 3, wherein said acquisition means is arranged on a carriage for conveying the printhead.

5. The apparatus according to claim 4, wherein said acquisition means includes transmission means for transmitting the instruction to the printhead.

* * * * *